United States Patent
Haupt et al.

(10) Patent No.: US 7,819,774 B2
(45) Date of Patent: Oct. 26, 2010

(54) CONNECTION BETWEEN TWO TRANSMISSION COMPONENTS HAVING ROUND CROSS-SECTIONS, FOR THE SUPPORT OF AXIAL FORCES

(75) Inventors: Josef Haupt, Tettnang (DE); Martin Brehmer, Constance (DE); Heinz-Günther Hilpert, Alsting (FR)

(73) Assignee: ZF Friedrichshafen AG, Friedrichshafen (DE)

( * ) Notice: Subject to any disclaimer, the term of this patent is extended or adjusted under 35 U.S.C. 154(b) by 311 days.

(21) Appl. No.: 12/120,516

(22) Filed: May 14, 2008

(65) Prior Publication Data

US 2008/0312028 A1    Dec. 18, 2008

(30) Foreign Application Priority Data

Jun. 15, 2007    (DE) .................. 10 2007 028 259

(51) Int. Cl.
*F16H 57/08* (2006.01)
(52) U.S. Cl. ...................................... 475/331
(58) Field of Classification Search .............. 475/331; 403/274, 277; 74/446, 431
See application file for complete search history.

(56) References Cited

U.S. PATENT DOCUMENTS

| | | | | |
|---|---|---|---|---|
| 1,265,811 A | * | 5/1918 | Ohlson | 74/460 |
| 1,340,011 A | * | 5/1920 | Carver | 74/446 |
| 3,071,986 A | * | 1/1963 | Schwerdhofer | 475/331 |
| 3,842,481 A | * | 10/1974 | Laing | 29/434 |
| 4,043,021 A | * | 8/1977 | Mosbacher et al. | 29/437 |
| 4,652,169 A | | 3/1987 | Matthews | |
| 4,945,782 A | * | 8/1990 | Farrell | 74/431 |
| 5,226,756 A | * | 7/1993 | Takahashi et al. | 403/274 |
| 5,267,807 A | | 12/1993 | Biedermann et al. | |
| 5,727,896 A | * | 3/1998 | Buer et al. | 403/24 |
| 5,906,135 A | * | 5/1999 | Prater | 74/446 |
| 6,007,430 A | | 12/1999 | Prater | |
| 6,035,737 A | * | 3/2000 | Prater | 74/446 |
| 6,293,725 B1 | * | 9/2001 | Winkvist | 403/282 |
| 6,651,336 B1 | * | 11/2003 | Bauknecht et al. | 29/893 |
| 6,729,199 B2 | | 5/2004 | Haupt et al. | |

FOREIGN PATENT DOCUMENTS

| | | |
|---|---|---|
| DE | 44 07 521 A1 | 9/1995 |
| DE | 195 44 316 A1 | 5/1996 |
| DE | 199 61 988 A1 | 7/2001 |
| EP | 0 195 150 A1 | 9/1986 |
| EP | 1 240 439 B1 | 9/2005 |

* cited by examiner

*Primary Examiner*—Dirk Wright
(74) *Attorney, Agent, or Firm*—Davis & Bujold, P.L.L.C.

(57) ABSTRACT

A positively-locking connection between two components of a transmission that have round cross-sections, designed to support axial forces. A first component to be connected has an annular flange with windows stamped out around its circumference. The windows enable simple deformation of the annular flange. The second component to be connected has an annular groove such that after bringing the two components together, the annular flange of the first component, when viewed axially, is positioned over the annular groove of the second component, such that the annular flange of the first component can be pressed radially into the annular groove of the second component so that segments of the annular flange radially engage the annular groove.

7 Claims, 5 Drawing Sheets

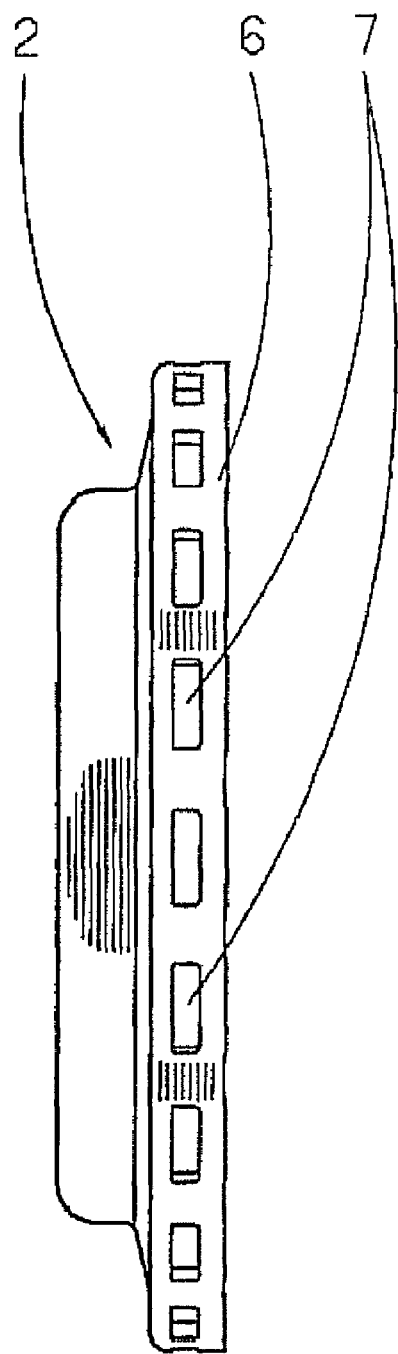
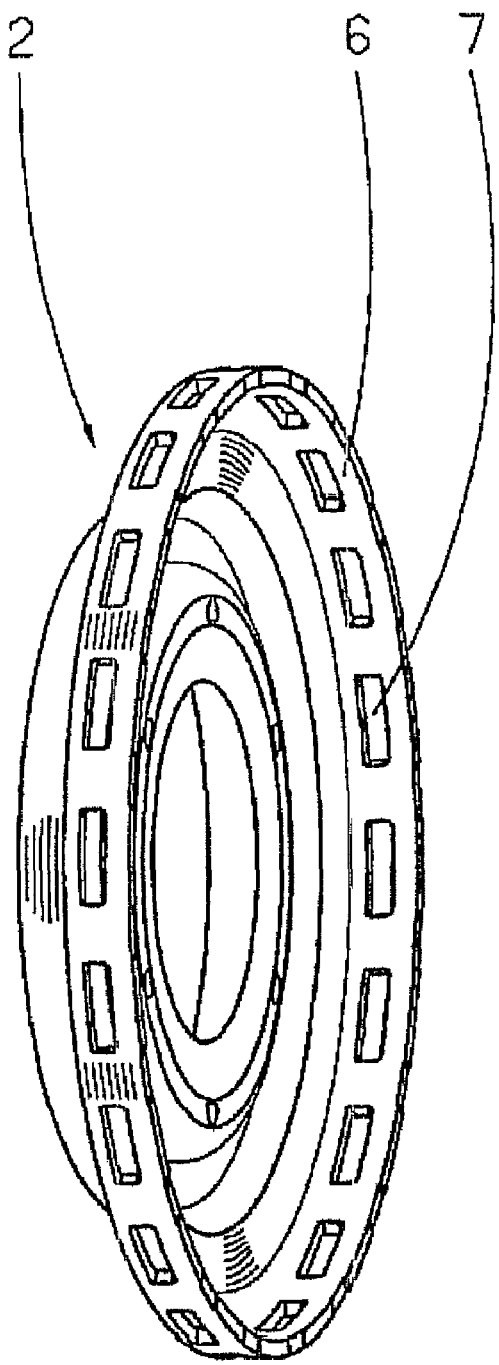
FIG. 2A
FIG. 2B

CONNECTION BETWEEN TWO TRANSMISSION COMPONENTS HAVING ROUND CROSS-SECTIONS, FOR THE SUPPORT OF AXIAL FORCES

This application claims priority from German Application Serial No. 10 2007 028 259.3 filed Jun. 15, 2007.

FIELD OF THE INVENTION

The present invention relates to a connection between two components of a transmission that have round cross-sections, designed to support axial forces.

BACKGROUND OF THE INVENTION

From EP 1 240 439 B1 by the present Applicant, a device for torque transmission and for axially securing first and second torque transferring components is known. The device has the shape of an annular structural element with projections spaced apart around its circumference that can be inserted into gaps between projections of the second component resting in contact with the first component in such a manner that the sides of the projections, facing toward the said surface of the first component, can be attached to the surface of the first component.

In addition, from DE 195 44 316 B4, a rotary component coupling structure for a force transmission device is known with a first rotary component which has a plurality of first axially extending projections with gaps between the projections. The gaps have gap-bottom surfaces and a second rotary component which has a plurality of second projections that extend radially. The second projections engage in the gaps between the first projections. In addition, it is provided that the second projections can be supported in a first axial direction by the gap-bottom surfaces of the gaps and in a second axial direction by an abutment element. The abutment element is attached to the first projections.

These connection modes, known from the prior art, are of relatively complex structure and entail high production and assembly costs.

The purpose of the present invention is to provide a fixed connection for the support of axial forces between two components of a transmission that have round cross-sections, such that very large axial forces can be withstood over the service life of the transmission. In addition, production and assembly costs should be low. In particular, a connection between an annular gear of a gearset and an annular gear carrier is envisaged. No transmission of torque is required.

SUMMARY OF THE INVENTION

It is proposed to make the connection as a positively-locking connection produced by deformation. In an especially advantageous embodiment of the invention, it is proposed to provide one of the components to be connected with an annular flange preferably having stamped-out windows distributed uniformly around its circumference, while the other component to be connected is provided with an annular groove.

The connection is then formed by bringing the two components together or inserting one into the other in such manner that the annular flange of the first component, viewed axially, is positioned over the annular groove of the second component. The annular flange of the first component is then deformed radially into the annular groove of the second component by way of a punching tool extending radially from the center of the components so that segments of the annular flange engage radially with the annular groove.

According to the invention, it can be provided that one such deformation takes place in association with each stamped-out window of the annular flange. Preferably a wedge tool is used for this. Alternatively, the use of other suitable tools, such as hydraulic tools, is also possible.

BRIEF DESCRIPTION OF THE DRAWINGS

The invention will now be described, by way of example, with reference to the accompanying drawings in which:

FIGS. 2A and 2B are respectively a lateral view and an inside perspective view of a ring gear carrier made according to the invention, which is to be connected to the ring gear;

DETAILED DESCRIPTION OF THE INVENTION

Figure 1:
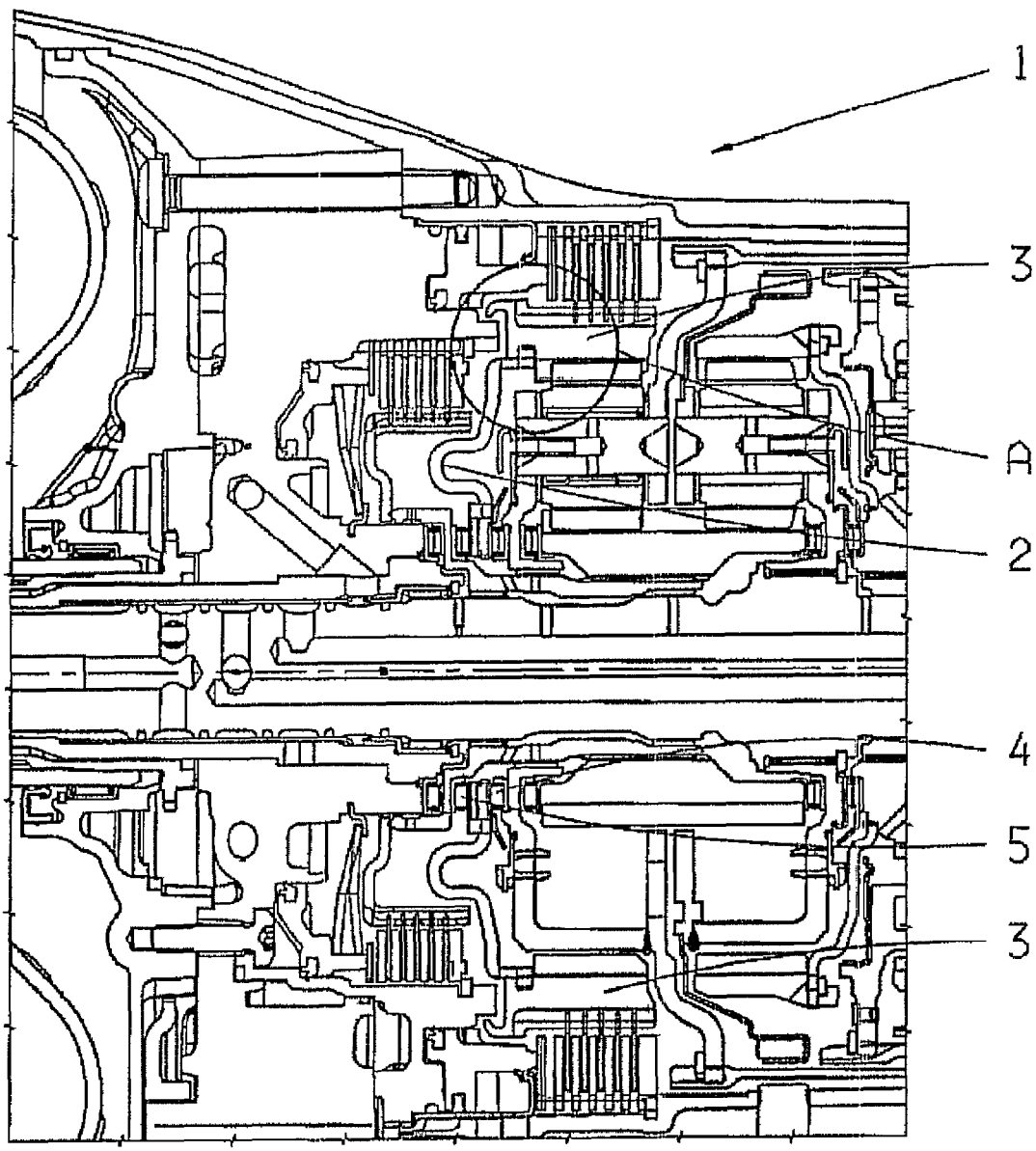
FIG. 1 is a sectional view of an automatic transmission of a motor vehicle in which a ring gear carrier is to be connected to the ring gear of a gearset in accordance with the present invention.

FIG. 1 shows an automatic transmission 1 of a motor vehicle. A ring gear to be connected to a ring gear carrier 2 is indexed 3. In the transmission 1 illustrated, the ring gear carrier 2 serves to transmit the axial forces that occur to two axial bearings 4 and 5. The connection between the ring gear 3 and the ring gear carrier 2, identified by the circle A, is to be made such that large axial forces can be withstood.

According to the invention, it is proposed to provide one component, namely the ring gear carrier 2, with a annular flange 6 having stamped-out windows 7 preferably distributed uniformly about its circumference; these serving to enable the formation of a positive-lock connection between the ring gear 3 and the ring gear carrier 2 by virtue of the simple deformability of the annular flange 6. This is made clear by FIG. 2A, which shows a perspective inside view (FIG. 2B) and a lateral view (FIG. 2A) of the ring gear carrier 2 made according to the invention.

Figure 3:
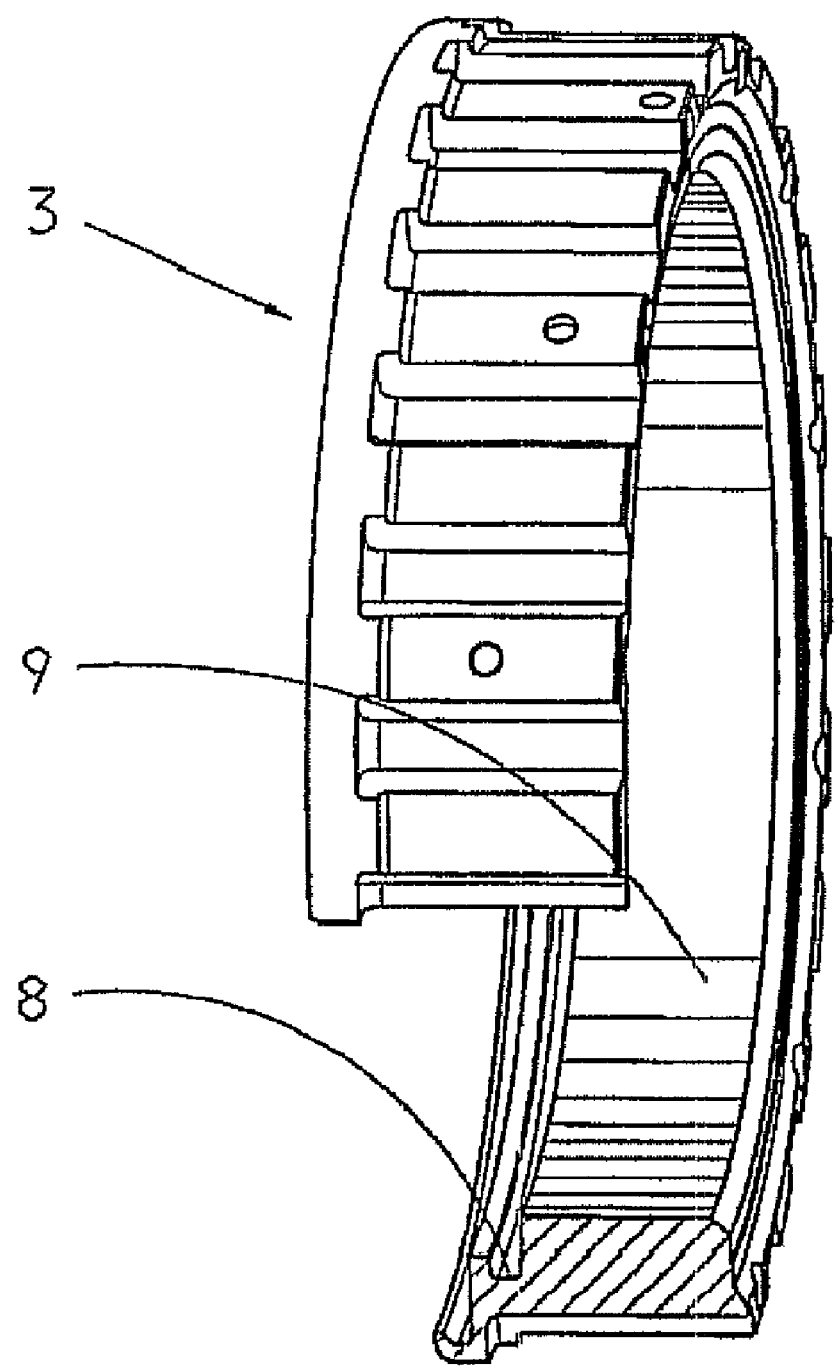
FIG. 3 is a perspective view showing a ring gear made according to the invention, from which a segment of approximately 80 degrees has been cut out, which is to be connected to the ring gear carrier.

In addition the second component, namely the ring gear 3, has a annular groove 8 as shown in FIG. 3.; the ring gear body is indexed 9 in FIG. 3.

Figure 4:
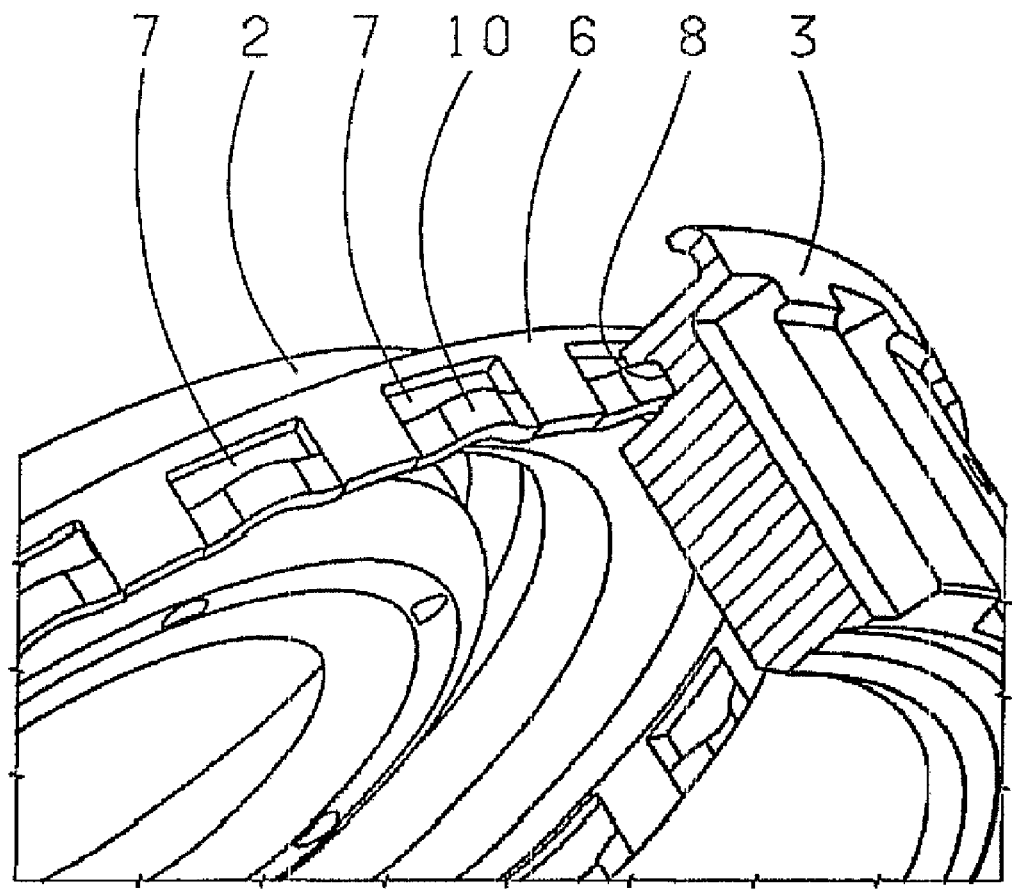
FIG. 4 is a perspective view of the ring gear carrier and the ring gear after connection, a segment of the ring gear having been cut out in order to clarify the invention.
Figure 5:
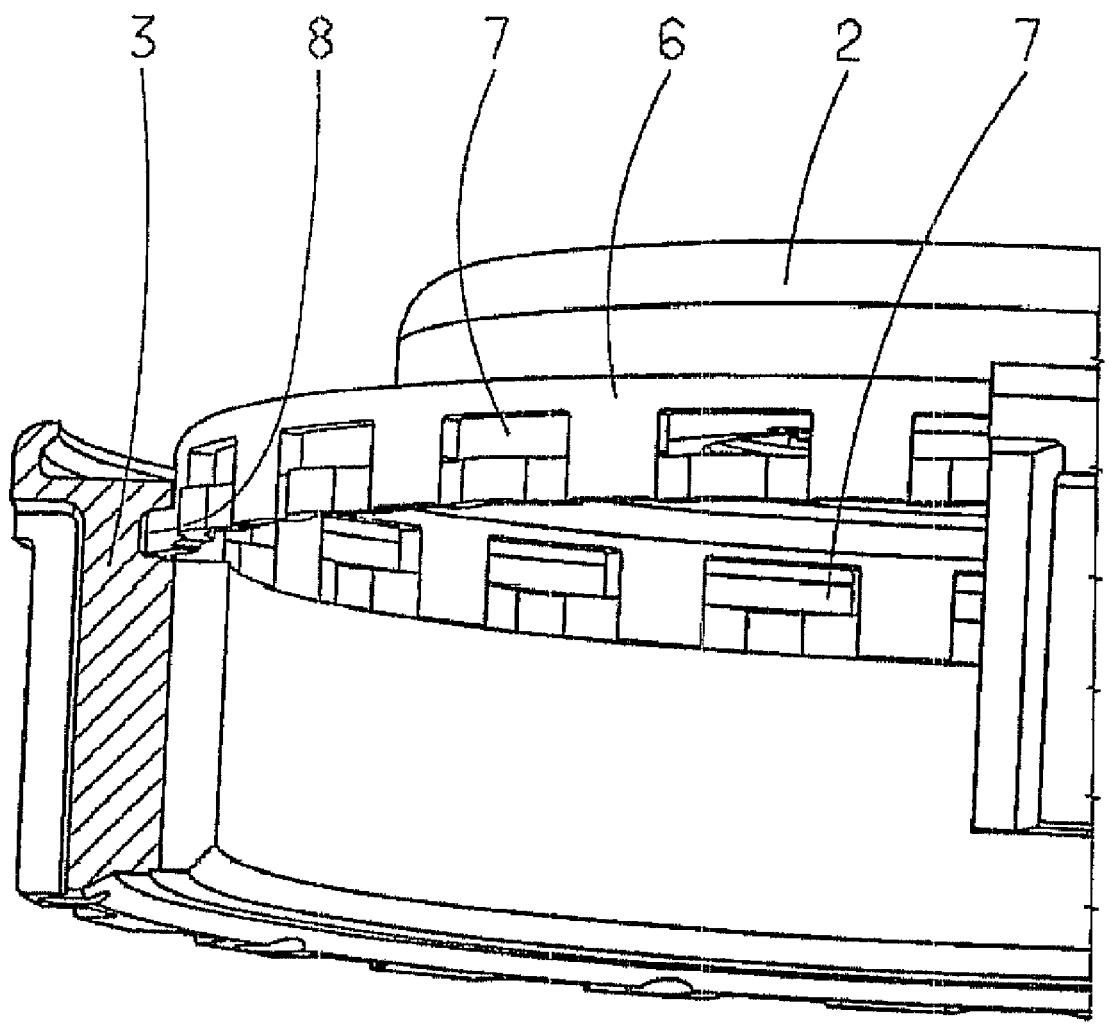
FIG. 5 is another perspective view of the ring gear carrier and the ring gear after connection, a segment of the ring gear having been cut out in order to clarify the invention.

To form the connection, the two components 2, 3 are brought together or inserted one into the other so that the annular flange 6 of the ring gear carrier 2, viewed axially, is positioned over a annular groove 8 of the ring gear 3 in such a manner that the annular flange 6 can be radially pressed into the annular groove 8 of the ring gear 3 by way of a punching tool extending radially outward from the center of the components 2, 3 so that segments 10 of the annular flange 6 engage radially with the annular groove 8, as shown in FIGS. 4 and 5.

FIGS. 4 and 5 show the ring gear 3 and the ring gear carrier 2 after assembly. As can be seen from these Figures, segments 10 of the annular flange 6 have been pressed into the annular groove 8. In the examples illustrated, there is one such pressed-in area for every stamped-out window 7 of the annular flange 6.

By virtue of this design, a connection can be produced simply and inexpensively between two transmission components that have round cross-sections, in particular between a ring gear and a ring gear carrier, which is able to support large axial forces.

REFERENCE NUMERALS 1 transmission
2 ring gear carrier
3 ring gear
4 axial bearing
5 axial bearing
6 annular flange
7 window
8 annular groove
9 ring gear body
10 segment of the ring flange

The invention claimed is:

1. A connection between first and second components of a transmission that have round cross-sections, the connection being designed to support axial forces and the connection being made positively locking by deformation means;
wherein the first component (2) to be connected has an annular flange (6) with windows (7) stamped out around a circumference of the flange (6), which enable simple deformability of the annular flange (6), and the second component (3) to be connected has an annular groove (8) such that after bringing the first and the second components (2, 3) together, the annular flange (6) of the first component (2), when viewed axially, is positioned over the annular groove (8) of the second component (3), such that the annular flange (6) of the first component (2) can be pressed radially into the annular groove (8) of the second component (3) so that segments (10) of the annular flange (06) radially engage the annular groove (8).

2. The connection according to claim 1, wherein one pressed-in segment is associated with each stamped-out window (7) of the annular flange (6).

3. The connection according to claim 1, wherein the windows (7) are distributed uniformly around the circumference of the annular web (6).

4. The connection according to claim 1, wherein a wedge tool and a hydraulic tool are used to press in the annular flange (6) which extends radially outward from a center of the first and the second components (2, 3) during assembly.

5. The connection according to claim 1, wherein the first component (2) is a ring gear carrier and the second component (3) is ring gear of a gearset of the transmission (1).

6. A transmission assembly of two inter-connected components, the transmission assembly comprising:
a first component (2) being rotatably supported along an axis, the first component (2) having an axially extending annular flange (6) fixed thereto, with a plurality of windows (7) located around a circumference of the annular flange (6), the plurality of windows (7) defining a plurality of segments (10) of the annular flange (6), and each of which being axially directly adjacent one of the plurality of windows (7);
a second component (3) being rotationally supported along the axis, and the second component (3) having an annular groove (8) about an interior surface; and
the annular flange (6) axially extending radially inside the interior surface of the second component (3) such that the plurality of segments (10) of the annular flange (6) are directly aligned with the annular groove (8) about the interior surface of the second component (3), and the plurality of segments (10) of the annular flange (6) radially protrude into the annular groove (8) of the second component (3) such that the first component (2) and the second component (3) are axially positively locked with one another.

7. A method of positively locking a ring gear carrier (2) and a ring gear (3) of a transmission (1) with one another, the method comprising the steps of:
providing the ring gear carrier (2) with an axially extending annular flange (6);
stamping a plurality of windows (7) around a circumference of the annular flange (6) of the ring gear carrier (2) and each of the plurality of windows (7) defining a segment (10) of the annular flange (6) located adjacent thereto;
providing an interior surface of the ring gear (3) with an annular groove (8);
co-axially inserting the ring gear carrier (2) into the ring gear (3) such that each of the plurality of the segments (10) is axially aligned with the annular groove (8) of the ring gear (3); and
radially outwardly deforming the plurality of the segments (10) of the ring gear carrier (2) such that the plurality of the segments (10) radially engage the annular groove (8) to axially positively lock the ring gear carrier (2) and the ring gear (3).

* * * * *